Jan. 24, 1933.  D. COLE  1,895,276
CONTINUOUS FILTRATION
Filed Feb. 27, 1928  5 Sheets-Sheet 1
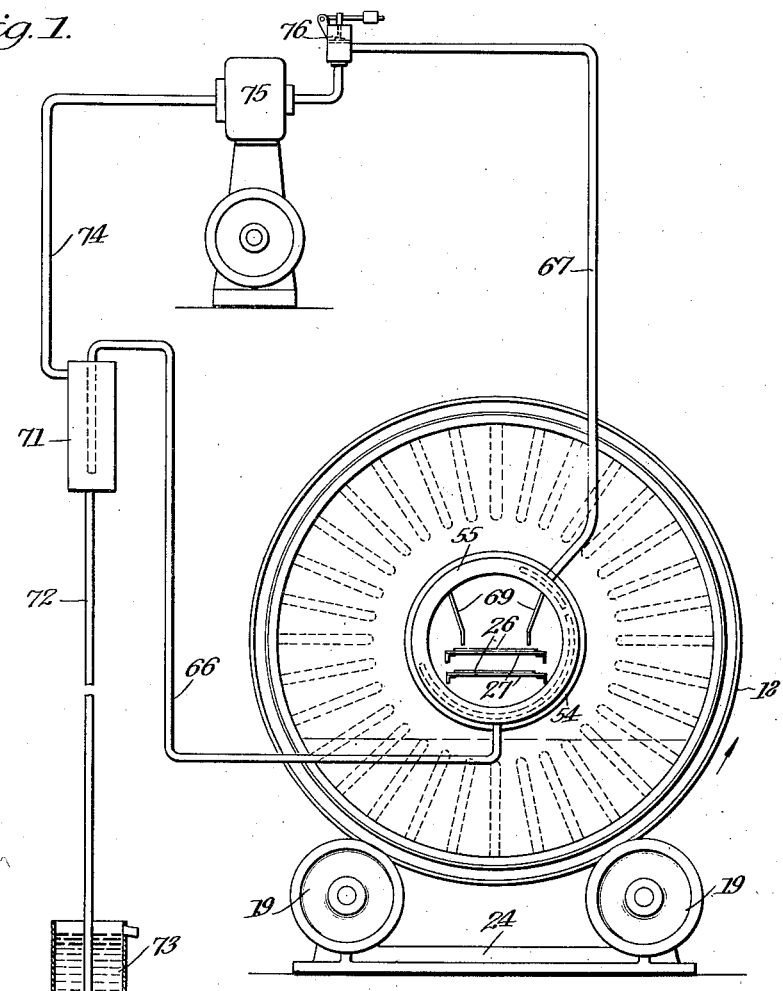
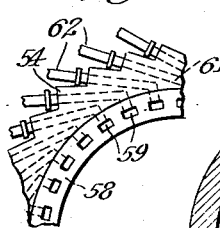
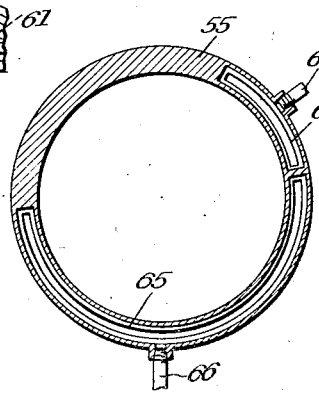
Inventor
David Cole
By Dodge and Sons
Attorney

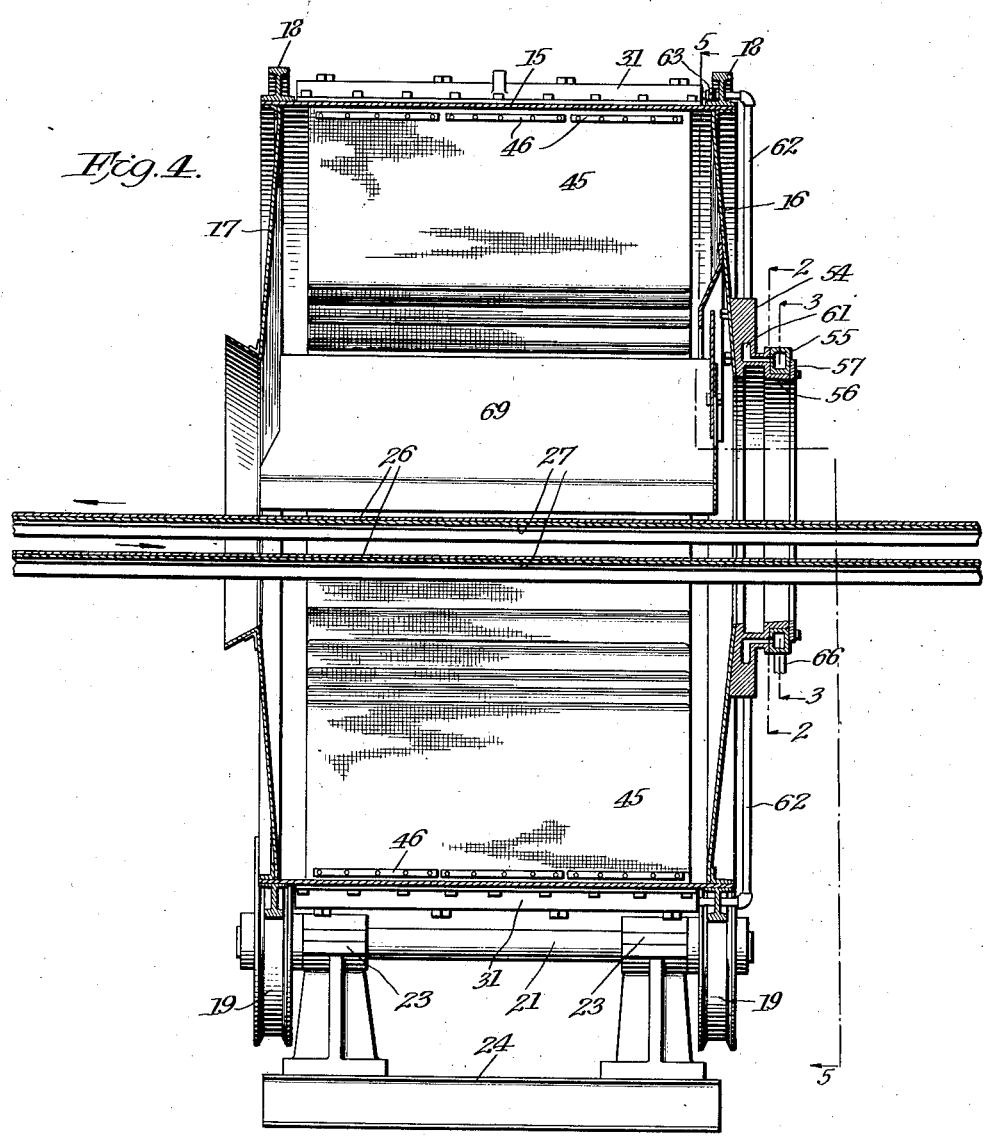

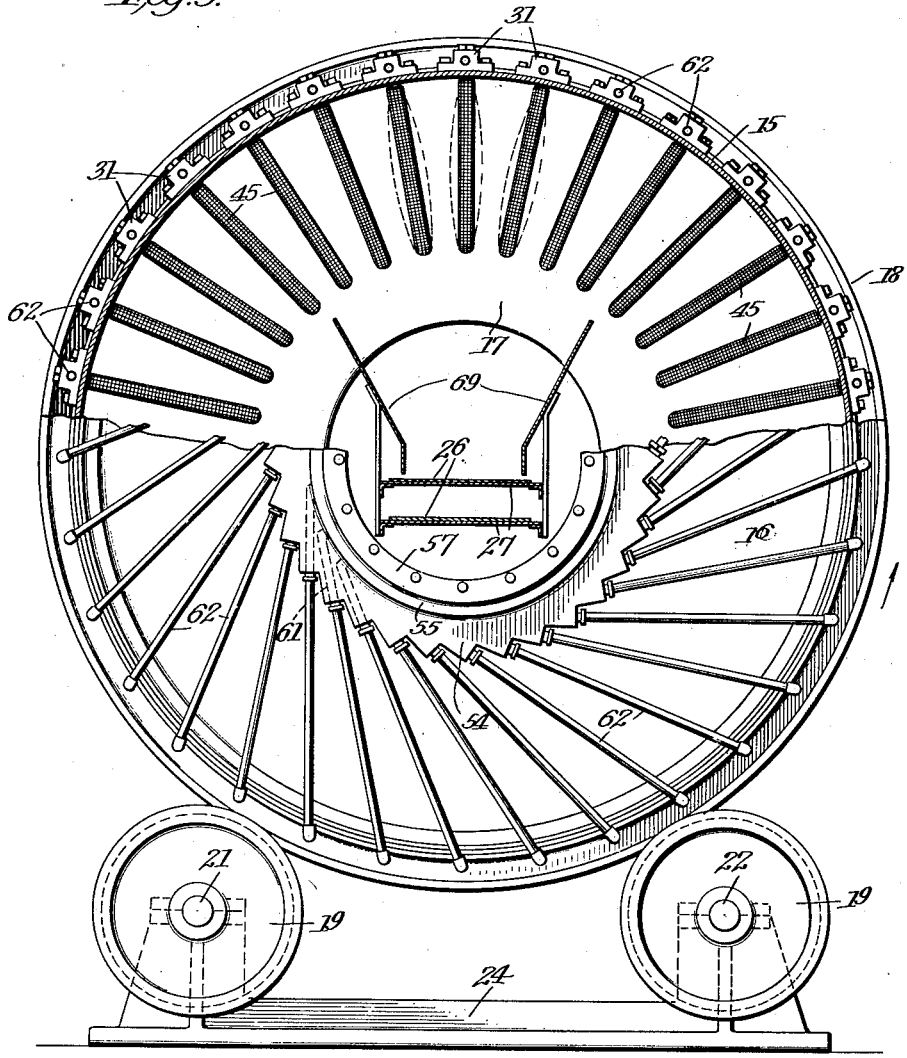

Jan. 24, 1933.   D. COLE   1,895,276
CONTINUOUS FILTRATION
Filed Feb. 27, 1928   5 Sheets-Sheet 4

Inventor
David Cole
By Dodge and Sons
Attorney

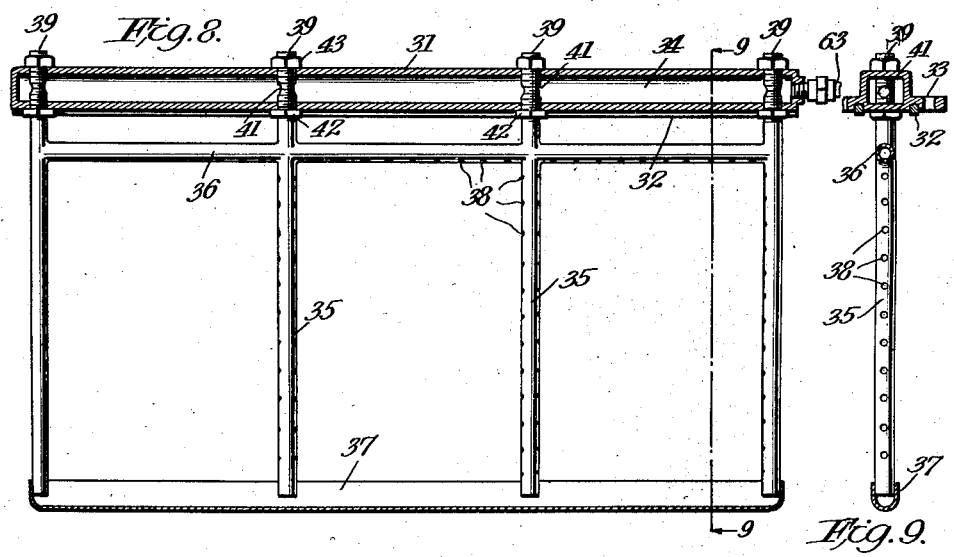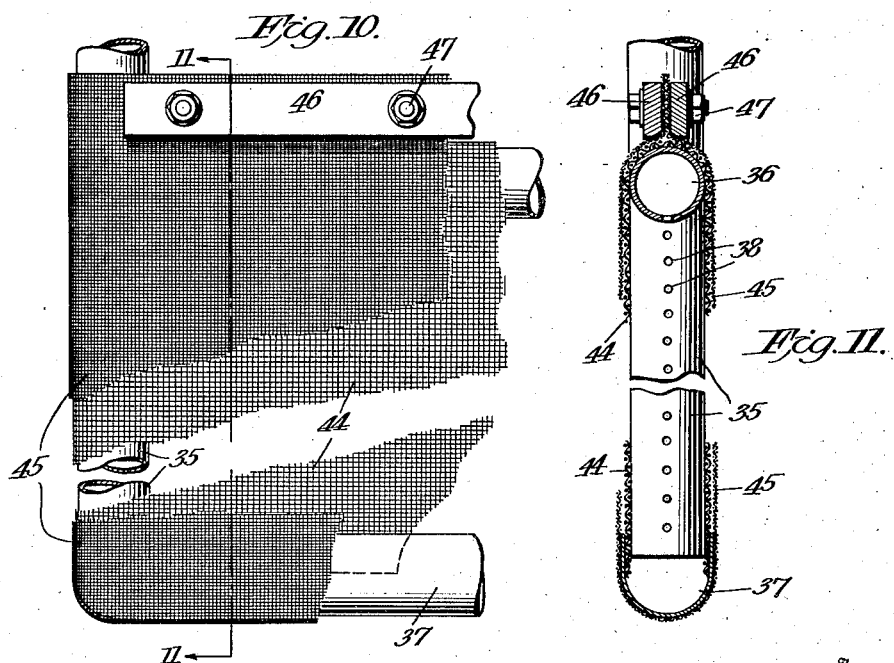

Patented Jan. 24, 1933

1,895,276

UNITED STATES PATENT OFFICE

DAVID COLE, OF EL PASO, TEXAS

CONTINUOUS FILTRATION

Application filed February 27, 1928. Serial No. 257,281.

This invention relates to continuous filters and resides in a number of improvements which increase the capacity of such filters, simplify the maintenance thereof and result in the production of a drier cake.

The invention is shown as applied to that type of filter in which a plurality of individual filtering elements are mounted on the interior of a revolving drum which contains in its lower portion the liquid to be filtered. Each unit thus passes alternately through the liquid and then through the air. While submerged in the liquid and for a period after rising out of the liquid, it is subjected to suction and thereafter, preferably near its highest point in its circular path, it is subjected to internal pressure to blow off the cake.

Attention is invited to the following novel features in the consideration of the detailed description which will be given.

Unlike prior filters of the type the suction for performing the filtering operation and the pressure for discharging the cake are both generated by a single pump. This result is, I believe, best secured by the interposition of a liquid trap with barometric liquid discharge in the suction connections between the filter units and the pump, but the essential thing is separation and separate discharge of the liquid, and various separating traps may be used. The use of a single cylinder pump gives a fluttering discharge pressure which is peculiarly effective in freeing the cake from the filter units.

Instead of using a central valve unit for controlling the suction and pressure of the individual filter units, the valve is constructed as a large annulus concentric with the drum, and surrounding a large opening in the drum head.

This has two advantages. It permits a plurality of such filter drums to be mounted in axial alinement and to be driven by a single shaft, all of said units being served by a single belt conveyor which passes axially through all the units and which carries the discharged cake from all the units. Further, by making the pipe connections from the annular valve to the individual filter units tangential or approximately tangential to the relatively large valve annulus, it is possible to secure a favorable drainage angle for liquid from the interior of the filter units. This results in a drier cake.

The filter units are made in the form of plates or leaves which are inserted radially or approximately so, through slots in the cylindrical surface of the rotary drum. Each filter unit is fixed on a removably mounted chambered head with the interior of which it communicates. It follows that each unit is capable of individual removal with its head for inspection or repair, and such removal is effected from outside the drum and without draining the drum.

The units do not extend the entire length of the drum, clearance being left around one or both ends for the off-flow of liquid as the filter units rise out of the liquid bath in the drum.

This arrangement allows very close spacing of adjacent units and enormously increases the available filter surface in a device of this character. The filter sustaining frame is formed of tubing covered with a wire sheath or support for the filter cloth. A bag shaped filter cloth is used. This may be readily removed from the frame and though of the simplest form is held taut and sealed around the frame by a clamping structure of the utmost simplicity.

Another feature of the invention is the use, within each filter element, of a trough or cup which, in the cake discharging position of the unit, receives and retains any liquid which may remain within the units and prevents such liquid from being blown out during the discharge of the cake. The effect is further to minimize the discharge of filtrate with the solids, so that the solids leave the apparatus in much drier condition than it has been possible to secure heretofore with filters of the continuous type.

Other incidental advantages will appear in connection with the description of the preferred embodiment of the invention which will now be given in connection with the accompanying drawings, in which,—

Fig. 1 is a diagrammatic elevation showing the connections between a single filter unit and a single cylinder pump.

Fig. 2 is a fragmentary section on the line 2—2 of Fig. 4, showing the rotating element of the pressure and suction distributing valve.

Fig. 3 is a section on the line 3—3 of Fig. 4 showing the fixed or non-rotating element of said distributing valve mechanism.

Fig. 4 is a vertical axial section through the filter drum showing the filter units in place.

Fig. 5 is an elevation of the filtering drum looking from the right relatively to Fig. 4. In this view the upper portion is broken away on the line 5—5 of Fig. 4.

Fig. 8 is a view partly in elevation and partly in section of a filtering unit frame and its chambered head removed from the drum.

Fig. 9 is a section on the line 9—9 of Fig. 8.

Fig. 10 is a fragmentary view showing details of construction of the filter unit and indicating the manner of clamping the filter bag removably upon the unit.

Fig. 11 is a section on the line 11—11 of Fig. 10.

Figure 7:
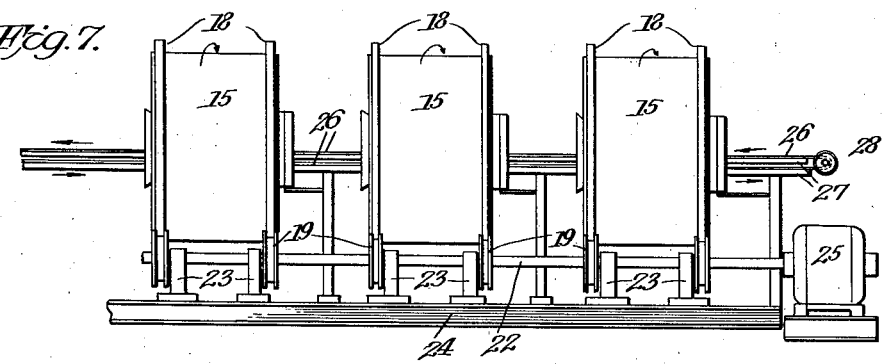
Fig. 7 is an elevation showing three of a series of filter drums mounted in axial alinement, driven by a single line shaft and discharging their cakes to a single belt conveyor which passes through the series.

Each filter drum comprises a cylinder shell 15 having slightly conical annular heads 16 and 17. The parts are connected by riveting or in any other suitable manner. At the ends of the cylindrical portion of the shell are riding rings 18, shown as made of light rail. These rings run on grooved supporting wheels 19 carried by shafts 21 and 22, certain of which are driven to rotate the drum. The shafts 21 and 22 are mounted in bearings 23 on a base 24. As illustrated in Fig. 7 a plurality of drums may be mounted in axial alinement in which case one shaft, for example, shaft 22, may, as indicated in Fig. 7, become a continuous shaft driven by a motor 25. In this way all of the drums 15 are driven in unison with each other and a single continuous base 24 may be used. In such case a belt conveyor 26 supported on guides 27 and driven in any suitable manner, as by driving the guide roller 28, may be arranged to extend axially through the whole series of drums 15. This conveyor is used to carry away the cakes which are discharged from the filter units as hereinafter more fully described, and such a conveyor may obviously be used with a single drum.

The cylinder wall 15 is formed with a plurality of slots each parallel with the axis of the drum and here shown as thirty-two in number, though any practicable number may be used. Each such slot is closed by a hollow removable head 31 sealed to the drum by a continuous oblong rectangular gasket 32 and held in place by bolts or studs passing through the holes 33 (see Fig. 9). Thus in effect each head 31 is a removable section of the drum wall.

Each head 31 encloses a chamber 34 through which project the radial members 35 of a tubular frame which supports the filter units. This frame is made up in addition to the radial tubular members 35 of a cross tubular member 36 and an elongated cup or trough 37. The tubular members 35 and 36 are preferably connected with each other by welding but might be connected by pipe fittings, and both are perforated, as indicated at 38. The radial members 35 are welded, or otherwise rigidly connected to the cup or trough 37 which thus acts as a spacer for the ends of members 35. The radial members 35 may be open at those ends which are within the trough or cup 37. The opposite ends 39 are plugged.

The radial members 35 communicate with chamber 34 by ports 41 drilled through them. They extend completely through the heads 31 and are locked in place by nuts 42 and 43 which are provided with gaskets not visible in the drawings, designed to secure absolutely tight joints. Any equivalent connection, preferably releasable, might be substituted.

Mounted on the frame work formed by the tubes 35 and 36 (but omitted from Figs. 8 and 9) is a metallic screen 44 which is shown in Figs. 10 and 11. This is mounted in any suitable way, for example, by folding it around the member 36 and soldering it to the margin of cup 37 and also to the endmost radial members 35. The function of the metallic screen is to offer flat surfaces sustained by the frame structure and serving in turn to sustain the filter cloth 45 when this is subjected to suction.

This filter cloth 45 is made in bag form and is drawn over the frame work and screen above described. It is clamped in the intervals between successive tubes 35 and between the tube 36 and the head 31 by means of clamping slats 46. These are filleted at their ends to fit snugly against the tubes 35 and are releasably held together by bolts 47, as clearly shown in Figs. 10 and 11. The effect is to produce a well supported hollow filter bag from the interior of which the tubes 35 draw liquid or air, or both, and deliver it to the chamber 34 within the head 31. The filter bag is so sealed to and around the frame by the clamping slats 46 that liquid and air may enter only by passing through the meshes of the bag.

Mounted at the inner margin of one annular head 16 is an annular member 54 which serves as the rotary valve member and serves also to sustain an annular fixed valve member 55 designed to coact therewith. The fixed valve member 55 is guided by a flange 56 formed on the rotary member 54 and is retained by a removable ring 57.

The valve member 55 is held laterally against the seat 58 formed in member 54. In the seat 58 are uniformly spaced ports 59, one for each filter element. In the example shown there are thirty-two ports 59 each to correspond with one of the thirty-two filter elements. Each port 59 is connected by a passage 61 formed in the member 54 and a communicating pipe 62 with the chamber 34 of a corresponding filter head 31. The connection of each pipe 62 with its head 31 is made readily releasable by means of a union 63. Any equivalent means of securing a quickly releasable fluid-tight connection may be substituted as will be obvious to those skilled in the art.

It will be observed particularly from an inspection of Fig. 5, that the pipes 62 are not radially disposed relatively to the drum, but on the contrary are approximately tangential with reference to the member 54. This arrangement has a definite purpose and a definite relation to the direction of rotation of the drum. As viewed in Fig. 5 the drum turns counterclockwise, and as will be perceived by comparison of Figs. 5 and 6, as soon as a given filter element rises above line A—A, which designates the normal liquid level in the drum, it is necessarily still inclined so as to drain toward the pipe 62. At the same time its pipe 62 has just passed beyond the horizontal position so as to drain liquid back toward its port 59. This draining relation persists until the filter unit has reached its horizontal position, which it reaches only after a substantial angular movement of the drum, and during such motion the filter unit with its attached cake is moving through the air. The effect is to drain filtrate away from the cake and dry the cake. This draining action ceases as soon as the filter element rises above the horizontal position. There can still be no reflux from the pipe 62 and filtrate remaining within the filter unit will drain to the cup 37 which retains it. In this way practically all filtrate within the filter element is removed bodily therefrom, but any filtrate remaining within the filter unit will be trapped by the cup and will not be discharged with the cake when the latter is blown off.

The valve member 55 is formed with two arcuate chambers which terminate in arcuate ports 64 and 65. The longer of the two, 65, is the suction port and is connected by a pipe 66 with the suction producing means, which may be the single pump hereinafter described, or, more broadly considered, any suitable equivalent. The shorter arcuate port 64 is connected with the pressure producing means by a pipe 67, such pressure producing means being that specifically described hereinafter, or equivalents known in the art.

Figure 6:
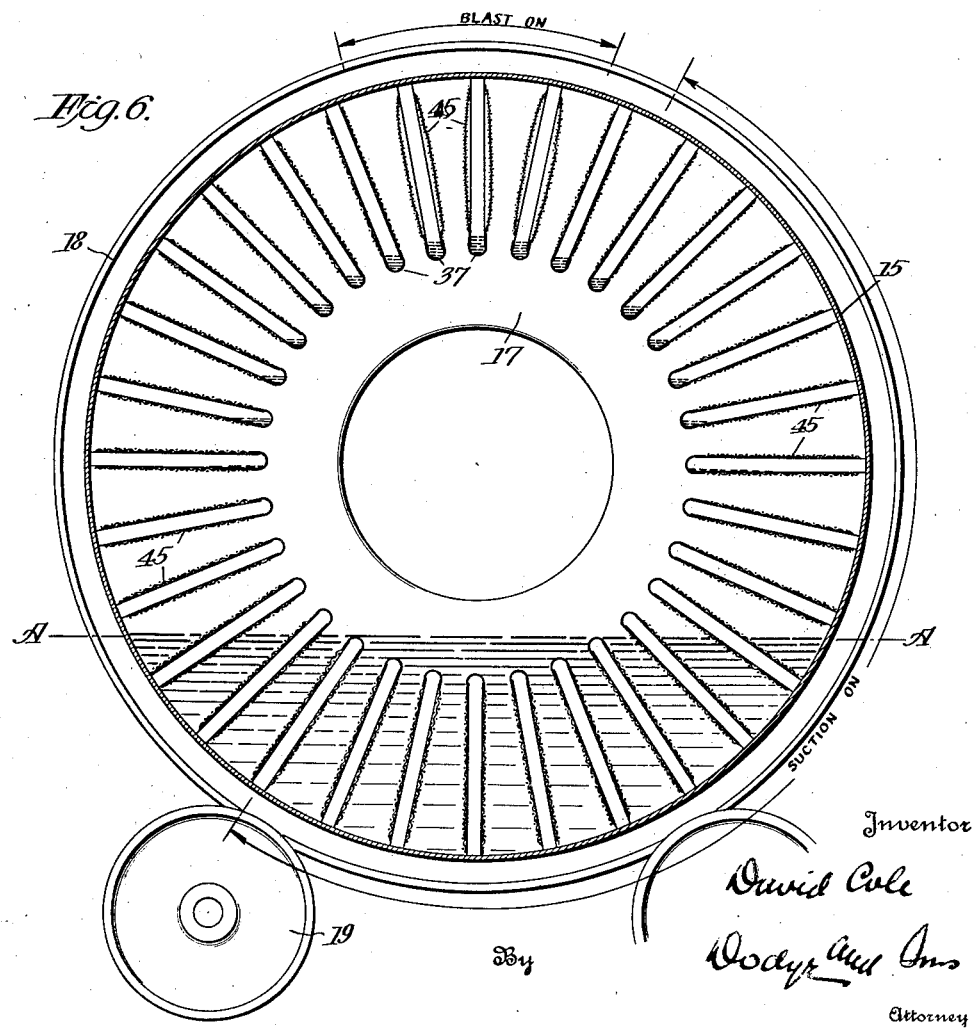
Fig. 6 is a diagrammatic section omitting unessential details and indicating the angles through which the suction is applied and through which pressure is applied during the rotation of the drum. In this view the level of the liquid undergoing filtration is indicated as is the action of the liquid retaining cups within each filtering unit.

It will be observed from an examination of Figs. 5 and 6 that the cake is discharged simultaneously from three or four filter units at the highest point in their travel, such discharge being indicated by showing the filter bags in dotted lines in a distended condition. The discharge is also indicated on Fig. 6 by the legend "blast on".

It will be observed from an examination of Fig. 6 that, as indicated by the legend "suction on" suction is applied to a filter unit as soon as it is completely submerged and such suction is continued nearly to the point at which the blast is applied, there being merely such lap interval between the two ports 64 and 65 as is necessary to prevent direct connection of these ports 64 and 65 by one of the individual ports 59.

To secure proper timing of the suction and blast, the ports 64 and 65 (see Fig. 3) are necessarily angularly displaced to compensate for the angular offset between each head 31 and its corresponding port 59 in the member 54. This angular offset is caused by the tangent arrangement of pipes 62.

The discharging cakes are guided to the conveyor by plates 69 supplied in the belt guides 27.

The parts so far described may be used with conventional apparatus for applying suction and blast, but advantages are secured by connecting the suction pipe 66 with a trap 71 into which the pipe 66 dips and from the bottom of which a barometric discharge tube 72 leads to an overflow tank 73. The length of the pipe 72 is such that gravity discharge will remove all liquid from the trap 71, allowing air to pass off from the trap 71 by way of the pipe 74 to the suction pump 75. The barometric tube 72 is merely a convenient means for discharging liquid against atmospheric pressure, and obviously any equivalent means, such as a pump, might be used should it be inconvenient to make use of the simpler barometric column suggested. The general equivalence of the two modes of operating will be obvious to those familiar with steam engine condenser practice.

The pump 75 is merely a compressor acting between sub-atmospheric pressure in the pipe 74 and a discharge pressure somewhat higher than atmospheric, the amount of the discharge pressure being chosen according to the amount of blast necessary to discharge the cake. Ordinarily this discharge pressure is low. Discharge from the compressor is connected to the blast pipe 67 already described and the maximum pressure is controlled by an ordinary safety valve 76.

It is obvious that a single compressor 75 may serve a plurality of filter drums connected in parallel between its discharge and suction, or if preferred individual pumps may be used for each filter unit. The use of a single cylinder pump is preferred because of the pulsating character of its discharge. This produces a fluttering of the filter cloths and consequently more rapid disengagement of the filter cake.

The location of the liquid discharging trap on the suction side of the pump relieves the pump of handling a mixture of air and liquid and increases the pulsating characteristic of the air discharge. Except for these advantages the location of the liquid trap is not necessarily on the suction side of the pump and traps are known which could be used in other positions to separate and discharge the water and thus ensure the feeding of air only to the filter units being freed of their cakes. Such alternative arrangement falls within the broad scope of this invention.

In operation the pump 75 is driven and the filter drum is rotated. Liquid to be filtered is fed to the interior of the drum at a proper rate and the conveyor belt 26 is driven. Each filter element as it passes through the bath of liquid in the drum is subjected to suction and accumulates a cake in such passage. As it emerges from the bath the suction is continued and the filtrate is practically completely drained away from the interior of the filter element because of the favorable oblique arrangement of the pipe 62. Suction is continued as the filter unit moves upward through the air, with the resulting drying of the cake. Any residual filtrate in the filter unit is trapped by the cup before the filter unit reaches that part of its path in which the blast is admitted. The blast dislodges the cake which falls upon the conveyor belt and is carried away. The liquid withdrawn from the drum as filtrate is intercepted by trap 71 and discharged through pipe 72 and sealing tank 73. The air withdrawn through the filter element is delivered by pipe 67 as blast for dislodging the cake.

It will be observed that the device is of the utmost simplicity. One compressor serves to supply suction and blast. A single conveyor may serve a plurality of filter units, all of which are alined and driven by a single motor through a single shaft. Each filter unit is removably mounted and may be readily withdrawn without draining the drum or disturbing other units. The units are interchangeable so that replacements are possible in the minimum time.

The parts are of simple and inexpensive construction and the operation of the device is such as to be understood by operatives of ordinary ability. While the best results are secured by using the various features above described in combination, certain of them are susceptible of use in other combinations. All of the features of the invention are susceptible of modification and no necessary limitation to the particular embodiment illustrated is implied.

What is claimed is,—

1. The method of continuous filtering, which consists in passing a series of filtering units through recurrent cycles each including a suction filtering phase while submerged in liquid to be filtered, a suction draining phase while in the air and a pressure cake-discharging phase; drawing liquid filtrate and air from the interiors of filter units in the filtering and draining phases; separating said filtrate and air; discharging said filtrate; and discharging said air at an elevated pressure through the filtering units in the discharge phase.

2. The method of continuous filtering, which consists in passing a series of filtering units through recurrent cycles each including a suction filtering phase while submerged in liquid to be filtered, a suction draining phase while in the air, and a pressure cake-discharging phase; drawing liquid filtrate and air at sub-atmospheric pressure from the interiors of filter units in the filtering and draining phases; separating said liquid and air while at sub-atmospheric pressure; discharging said liquid against atmospheric pressure; compressing said air to a pressure higher than atmospheric; and discharging said air outward through the filter units in the discharging phase.

3. The method of continuous filtering, which consists in passing a series of filtering units through recurrent cycles each including a suction filtering phase while submerged in liquid to be filtered, a suction draining phase while in the air, and a pressure cake-discharging phase; drawing liquid filtrate and air at sub-atmospheric pressure from the interiors of filter units in the filtering and draining phases; separating said liquid and air while at sub-atmospheric pressure; discharging said liquid against atmospheric pressure; compressing said air and imparting to it a pulsing pressure higher than atmospheric pressure; and discharging said air outward through the filter units in the discharging phase.

4. The method of filtering, which consists in providing a hollow filtering unit with an internal liquid retaining receptacle; submerging said filtering unit in a bath of liquid to be filtered and subjecting its interior to suction; withdrawing said unit from said bath and sustaining it in the air while subject to internal suction and in position to cause the draining of liquid filtrate from the receptacle and interior of the unit; positioning the unit to cause any residual filtrate to drain into said internal receptacle, then while in the last named position subjecting the unit to internal gas pressure to discharge adherent solids; and collecting said solids and the filtrate separately.

5. In a filter, the combination of means for containing a bath of liquid to be filtered; a hollow filtering element; means for carrying said element with motion having a rotary characteristic in a path which carries it alternately below and above the level of liquid in said containing means; a fluid conducting connection to said unit positioned by its rotary motion characteristic to drain the same as the unit first rises above said level; a liquid collecting receptacle mounted in said unit and positioned by said rotary motion characteristic to collect and retain residual liquid in the unit as the latter passes beyond said draining position; and means for admitting pressure fluid to said connection while said cup acts to retain residual liquid and to apply suction to said connection during submergence and draining of the unit.

6. In a continuous filter, the combination of a rotatable liquid containing drum formed with removable wall portions; and a plurality of hollow filter units mounted on said removable wall portions and capable of withdrawal outward from the drum by removal of such wall portions, the parts being so arranged that the rotation of the drum carries said units alternately above and below the liquid level therein, whereby such removal may be effected without draining said drum.

7. A continuous filter comprising in combination a rotatable liquid retaining shell mounted with its axis substantially horizontal, said shell being formed with slots in its periphery; a plurality of removable hollow filter units inserted into said drum through said slots and when in position serving to close said slots; and means controlled by the rotation of said drum for subjecting said elements alternately to suction and pressure.

8. A continuous filter comprising in combination a rotatable liquid retaining shell mounted with its axis substantially horizontal, said shell being formed with slots in its periphery substantially parallel with said axis; a plurality of removable hollow filter units projecting in substantially radial planes into said drum through said slots, and when in position serving to close said slots; and means controlled by the rotation of said drum for subjecting said units alternately to suction and pressure.

9. A continuous filter, comprising in combination, a rotatable shell mounted with its axis substantially horizontal, said shell being slotted and having annular heads open at their center; a plurality of filter units each including a head removably fixed in place to close a corresponding slot in said shell and carrying a hollow porous filter unit which projects through such slot and into the interior of said shell; an annular valve structure larger than the opening in one of said heads, and including an annular member which rotates with said shell and is provided with a plurality of ports, and a coacting annular member which is relatively fixed and has pressure and suction ports with which in alternation each port in the rotating member registers; and releasable fluid conducting connections between each of the ports in said rotary member and a corresponding filter unit.

10. A filter unit for use in filters in which the unit has a rotary motion characteristic comprising in combination a hollow filtering element and an internal sustaining frame therefor, said frame including a ported tubular structure and a liquid collecting cup, which latter defines a margin of the frame structure.

11. A filter unit for use in filters in which the unit has a rotary motion characteristic comprising in combination a hollow filtering element and an internal sustaining frame structure therefor, said frame structure including a tubular structure and a liquid collecting cup with which the interior of said tubular structure is in communication, said cup defining one margin of the frame structure and directly sustaining a portion of the hollow filtering element.

12. A filter unit for use in filters in which the unit has a rotary motion characteristic comprising in combination a chambered demountable head, releasable fluid conducting connections with the chamber in said head; a frame structure including a ported tubular unit and a cup member structurally united therewith, said tubular unit being in communication with the chamber in said head; and a filtering covering sustained by said tubular unit and cup.

13. A filter plant comprising in combination a plurality of rotatable liquid containing shells mounted with their axes substantially in horizontal alinement, and having centrally apertured ends; a plurality of filter elements mounted in each shell in annular series adjacent the peripheries thereof; means for subjecting said elements to internal suction while submerged in liquid in said shells and to internal pressure at times when they are elevated above said liquid; and a single traveling conveyor extending through the apertures in the ends of all said shells in series and arranged to receive solids discharged from said filter elements by said internal pressure.

14. The combination with a continuous filter having a plurality of hollow filter units and suction and pressure connections communicating in alternation with said units to form and partially dry cakes on the exterior thereof and then discharge the cakes; of a gravity trap into which said suction connection discharges; means for drawing liquid from said trap; a pump; and conducting connections from the trap to the suction of the pump and from the discharge of the pump to said pressure connection.

15. A filter unit for use in filters in which the unit has a rotary motion characteristic comprising in combination a hollow filtering element provided with an internal liquid collecting cup positioned to trap residual liquid in one position of the unit.

16. A continuous filter, comprising in combination, a rotatable liquid containing shell mounted with its axis substantially horizontal, said shell being slotted and having annular heads open at their centers; a plurality of filter units each including a head removably fixed in place to close substantially liquid tight a corresponding slot in said shell and carrying a hollow porous filter unit which projects through such slot and into the interior of said shell; an annular valve structure larger than the opening in one of said heads, and including an annular member which rotates with said shell and is provided with a plurality of ports, and a coacting annular member which is relatively fixed and has pressure and suction ports with which in alternation each port in the rotating member registers; releasable fluid conducting connections between each of the ports in said rotary member and a corresponding filter unit; and a conveyor structure extending through the openings at the centers of said heads and through said annular valve structure.

17. A continuous filter, comprising in combination a rotatable liquid retaining shell mounted with its axis substantially horizontal, said shell being formed with slots in its periphery substantially parallel with said axis; a plurality of removable hollow filter units projecting in substantially radial planes into said drum through said slots, and when in position serving to close said slots; a drain cup for residual liquid mounted in the inner end of each filter unit; and means controlled by the rotation of said drum for subjecting said units alternately to suction and pressure.

18. In a continuous filter, the combination of a substantially circular endless trough adapted to retain in its lower portion a bath of material to be filtered; means for rotating said trough on a substantially horizontal axis; a series of hollow filtering elements fixed in said trough in radial arrangement and adapted alternately to be submerged in said bath and to rise above the same as said trough rotates; a fluid conducting connection to each filtering unit, said connections being positioned by the rotation of the trough to drain a corresponding unit as the latter rises above the bath during the rotation of the trough; a liquid collecting receptacle associated with each unit at the end thereof toward the center of rotation of the trough adapted to trap and retain residual liquid within the filter unit as the latter rises beyond said draining position; and means associated with said fluid conducting connections to the various filters for subjecting them to suction as they pass through said bath and as they first rise above the same in draining position, and for subjecting them to pressure while said receptacles act to retain residual liquid.

In testimony whereof I have signed my name to this specification.

DAVID COLE.